Dec. 28, 1954     L. PETERS     2,698,248
SEPARABLE MOLD PACKAGE FOR SOFT PLASTIC FOODS
Filed Sept. 21, 1951     2 Sheets-Sheet 1
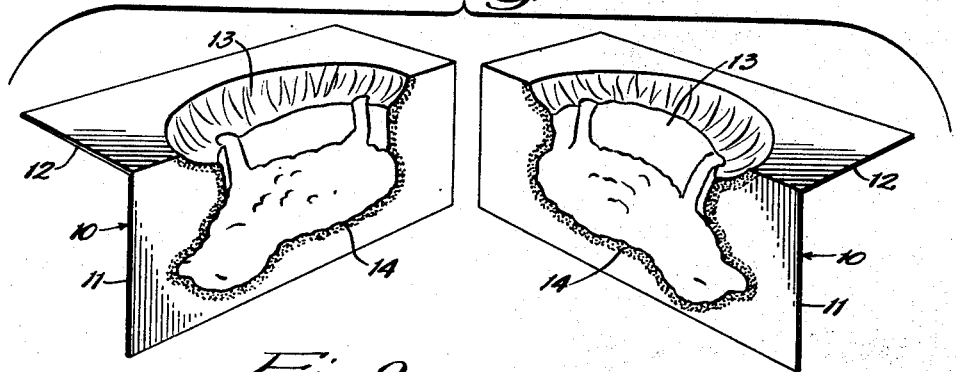
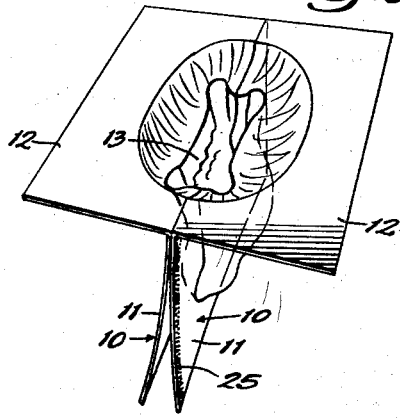
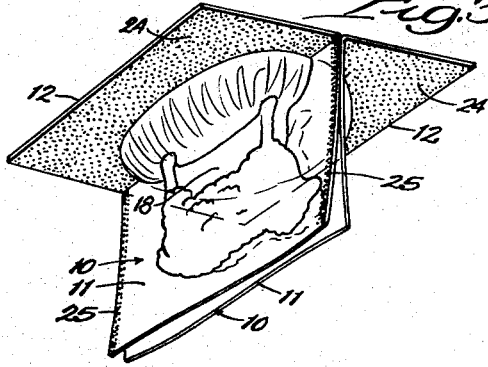
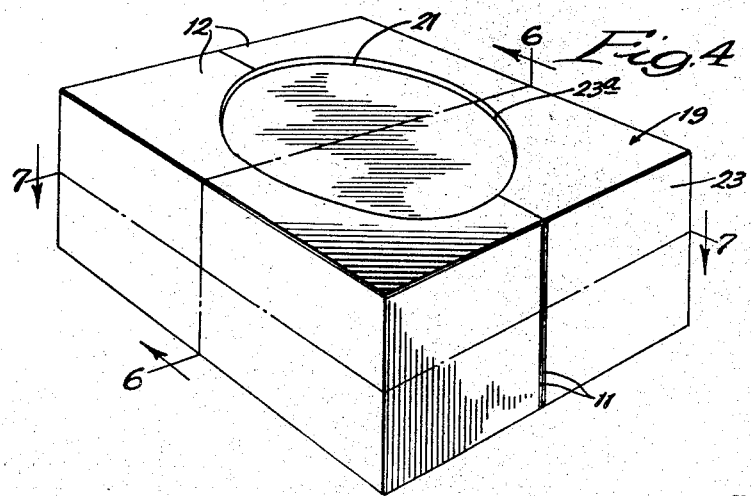
INVENTOR:
Leo Peters,
BY
Dawson & Ooms,
ATTORNEYS.

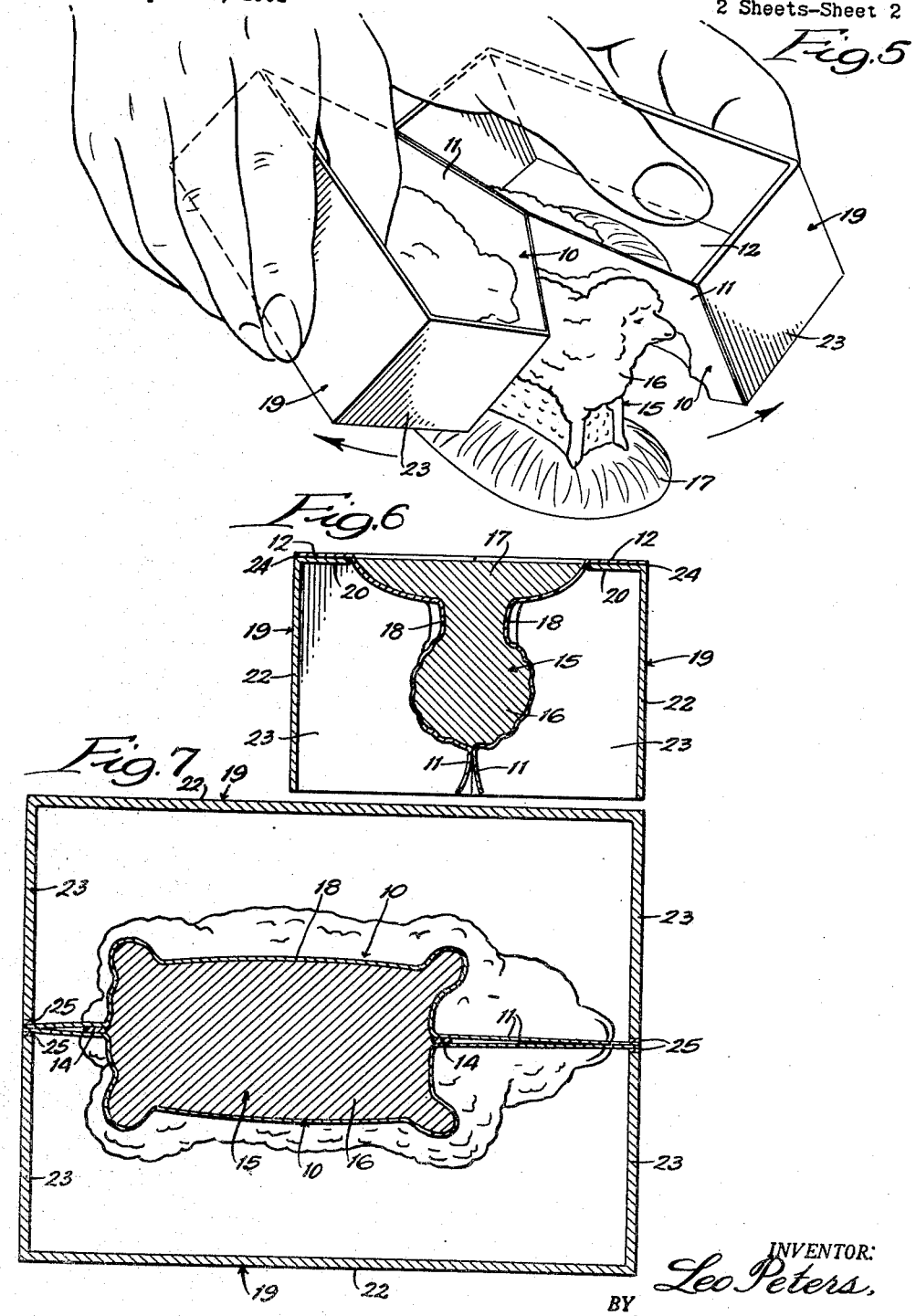

United States Patent Office 2,698,248
Patented Dec. 28, 1954

2,698,248

SEPARABLE MOLD PACKAGE FOR SOFT PLASTIC FOODS

Leo Peters, Evanston, Ill.

Application September 21, 1951, Serial No. 247,723

5 Claims. (Cl. 99—171)

This invention relates to a separable mold package for soft plastic foods, and more particularly to a package which will mold, carry, and permit removal without distortion of shaped foods which could not be removed intact through the neck of the package alone. The package is useful for packaging butter, margarine, ice cream, processed cheese, prepared gelatines, and a large number of other moldable soft plastic foods.

In the molding of food products, it is very common to find that the portion of the molds through which the fluid material is introduced is much narrower in cross-section than the lower portion of the mold, and it is, therefore, impossible to eject the final molded product through the inlet opening without destroying the molded shape. There has long been a need for an inexpensive disposable package structure which is effective for molding and carrying soft plastic foods in shapes which cannot be ejected through the neck and mouth of the package intact but which is dividable or separable to permit removal of the molded product easily and quickly without disfiguration.

Soft plastic foods such as butter, margarine, ice cream, etc., are soft and easily bruised even at relatively low temperatures, and solution of the problem precludes the use of such molding structures and methods as are used in molding plaster figurines, where the soft rubber mold is stretch-stripped from the hard figurines. On the other hand, if a non-stretchable cavity wall were employed, it would be necessary to break and strip piecemeal the container wall from the molded food, and such an operation would be difficult and messy even if it were possible to remove the material without marring the molded product.

An object of the present invention is to provide a cheap and safe method for molding soft plastic food into a packaged shape while permitting swift and easy removal from the package without disfiguring the molded food. A further object is to provide a structure for molding and carrying a soft plastic food, the base of which is of smaller cross-section than the cross-section thereof at another point paralleling the base, the package being separable to permit removal of the molded product intact. A further object is to provide a package for molding the soft plastic food which can be opened along the periphery of a line which may mark the halfway division line of the molded food contents. Still another object is to provide a package from which a molded soft plastic food may be removed by peeling apart two halves of a cavity-mold-wrapper. A further object is to provide a package liner composed of two duplicate shaped sections releasably fastened together to form an integrally shaped cavity for receiving and molding soft plastic foods, together with a frame support for the cavity permitting the cavity to hang downwardly within the support and out of contact with the support except at its upper edges, the support being separable to spread apart the liner for freeing the liner or film from the molded product. A still further object is to provide film sheets forming two cavity halves with a releasable seal only adjacent the cavity edges of the sheets while leaving projections extending outwardly so that the same may be easily grasped and pulled apart along their adjoining lengths. A still further object is to provide in the above structure a seal between the projections of the film and the box or support, the support being separable so that when the support or box is drawn aside after the package has been inverted, the base of the molded product may be deposited upon a receptacle and the sides of the liner or film stripped therefrom, leaving the molded product intact upon the receptacle. Other specific objects and advantages will appear as the specification proceeds.

The invention is shown in an illustrative embodiment by the accompanying drawings, in which—

Figure 1 is a perspective view of sheets or film strips having mold recesses therein and embodying my invention; Fig. 2, a perspective view of the mold sheets brought together to provide a complete mold; Fig. 3, a perspective view of the structure shown in Fig. 2, the view being taken from the lower side of the composite sheet structure; Fig. 4, a perspective view of a box or support within which the composite sheet mold is supported; Fig. 5, a perspective view of the box or support being separated to effect removal of all of the mold-forming sheets or film strips about the molded product; Fig. 6, a vertical sectional view of the support or box and the mold structure therein, the section being taken as indicated at line 6—6 of Fig. 4; and Fig. 7, a longitudinal sectional view, the section being taken as indicated at line 7—7 of Fig. 4.

In the illustration given, 10 designates a sheet or film strip which, in the particular form given, comprises a vertical portion 11 and a horizontal portion 12. Each of the sheets is provided with a mold recess 13 which, in the illustration given, provides a mold for one-half of a sheep standing upon a base. The two sheets providing half molds are cemented together by adhesive 14 to form the composite mold illustrated best in Figs. 2, 3, 6 and 7. When the mold is filled with a soft plastic food 15, the body of the sheep is formed mainly within the portion 16, while the base upon which the sheep stands is within the mold portion 17. Between the portions 16 and 17 the mold sheets form a neck or constricted portion 18, so that after the molding operation, it would be impossible to remove the molded body portion 16 through the neck 18 without destroying the mold lines of the body portion 16.

Any suitable material for forming the sheets 10 may be employed. It is only necessary that the sheets be receptive to the molding operation and retain the desired shapes for molding the soft plastic foods. I have obtained best results with a thin, thermoplastic, non-elastic film. For example, such films as unoriented polyethylene-glycol-terephthalate and unplasticized vinyl-chloride-acetate are particularly suited for this use. Films such as cellulose acetate, cellulose acetate butyrate, polyethylene, vinylidene chloride, as well as modifications of these, and other films, may also obviously be used.

The two sheets or sections 10 are molded and preformed to fit together with the mold recesses aligned to form the complete figure and base, and the portions immediately around the mold recesses are sealed together by adhesive 14 or by heat-sealing or other means. The sheets have portions projecting beyond the mold area, and these projections may have outer unsealed portions which will permit the housewife to grasp them easily for separating. By pulling upon the projections, the seal will be broken around the mold cavity and the film strips may be pulled loose from the molded contents quickly and easily without marring the soft plastic foods.

I prefer to support the strips 10 upon a box or support 19. In the specific illustration given, the support 19 is in the form of two box portions having top walls 20, each provided with a semicircular opening 21, outer side walls 22, and end walls 23. The box halves 19 do not have inner sides, and when the box halves are brought together, as shown more clearly in Figs. 4 and 7, there is provided a split or divided composite container or box with a circular opening 23a at the top thereof.

The horizontal portion 12 of each mold sheet 10 which projects laterally of the mold recess 13 is extended over the top wall 20 of each box half 19 and secured thereto by cement 24, as shown more clearly in Fig. 6. By this means, the mold sheets are suspended within the support so that the food content is swung freely within the composite box or support and at a spaced distance from the sides of the support.

If desired, the sides of the sheets 10 may be provided with adhesive 25, as shown more clearly in Figs. 2 and 4, and the edges of said sides may be secured by the adhesive 25 to the end walls 23 of the box halves 19.

Operation

In the operation of the structure, the sheets 10 are brought together to form the composite mold film shown in Figs. 2 and 3, and the sheets 10 are secured together by the adhesive 14 or heat-sealed, etc., about the mold recess. The top horizontal flaps 12 are provided with adhesive along their undersides, and the adhesive is attached to the top of the box walls 20 so that by this means the film mold is supported within the composite box formed by the halves 19. At the same time, the edges of the vertical sheet portions 11 are secured to the edges of the end walls of the box halves 19. Thus supported, the film mold is in a position to receive the soft plastic food. The soft plastic food, which is preferably fluid, is flowed into the upper portion of the mold, as shown in Fig. 6, and the fluid material 15 passes downwardly through the neck 18 to form the body portion 16 and the upper base portion 17 when the food hardens. A film wrapper may be secured about the support 19 during shipment and peeled off by the housewife when it is desired to open the package. With the package as shown in Fig. 6, the housewife first inverts the package and then pulls apart the box halves 19, as shown more clearly in Fig. 5, bringing the base 17 of the molded figure on a dish or other receptacle. As the halves 19 are pulled apart, the film projections along sides 11 and 12 separate along the line of the adhesive 14 so that the entire film mold leaves the molded product and the molded product strands with its mold lines intact upon the dish or other receptacle. The operation is accomplished without the hands of the user coming in contact with the molded food.

The structure permits of many variations. The adhesive employed may be fracturable or weak in character so as to break readily as the film structures are drawn apart. Rubber adhesives, pressure-sensitive adhesives, and fracturable glues of many types may be used. If heat-sealing is employed, the well-known practice of sealing the film at spaced intervals may be employed so as to make separation of the film easier at the time of removing the mold sheets. The adhesive employed for securing the film strips 11 and 12 to the container or box halves 19 may be animal or vegetable glues or other permanent glues which will anchor the sheets permanently to the support or box structures 19.

While, in the foregoing specification, I have set forth a specific structure in considerable detail, it will be understood that such details of structure may be varied widely by those skilled in the art without departing from the spirit of my invention.

I claim:

1. A soft plastic food package, comprising a divided support having top wall portions and end wall portions, a pair of sheets of plastic film having horizontal portions secured to the top wall portions of said supports, and vertical portions secured to the edges of said end walls, said sheets being pre-formed to provide complementary mold recesses, and releasably secured together about said mold recesses, and a soft plastic food filling said complementary mold recesses and conforming to the shape thereof.

2. A soft plastic food package, comprising a pair of supports having end and side walls and adapted to be brought together to form a composite container, a pair of sheets of thermoplastic film having horizontal top portions carried by said container, and vertical portions secured to the end walls of said container, said sheets being provided with inwardly-facing mold recesses, and being united about said mold recesses to form a composite mold and a soft plastic food filling said composite mold.

3. A soft plastic food package, comprising a pair of sheets of plastic film having mold recesses formed therein, each of said sheets having a laterally-extending upper portion and vertically-extending lower portions, said sheets being separably bonded together about said recesses which together form a composite mold, a soft plastic food in said composite mold, and a split box having a top portion supporting the horizontally-extending top portion of said sheets and having end portions bonded to the vertical portions of said sheets, whereby upon the separation of said box portions, said sheets are split apart about the molded food product.

4. In a soft plastic food package, facing plastic sheets having opposed mold recesses therein providing a composite mold cavity, said sheets being releasably secured together across an area about said mold recesses to make said mold cavity liquid retaining while being spaced apart in another area to permit said mold cavity to be filled, and a soft plastic food body in said mold cavity conforming to the shape thereof, said sheets also providing portions extending outwardly beyond the releasably secured areas thereof and being unattached to each other for use in pulling said sheets apart to release said soft plastic food body.

5. In a soft plastic food package, facing sheets of thin flexible thermoplastic material having opposed mold recesses therein for providing a composite mold cavity, said sheets having laterally-extending portions at the top of said mold cavity for supporting said sheets and being spaced apart at the top of said mold cavity between said laterally-extending portions to permit said mold cavity to be filled, said sheets being releasably secured together across an area around the sides and bottom of said mold cavity to make said mold cavity liquid retaining, a soft plastic food body in said mold cavity conforming to the shape thereof, and pull tab means connected to the releasably secured portions of said sheets for use in pulling said sheets apart to release said soft plastic food body.

References Cited in the file of this patent

UNITED STATES PATENTS

| Number | Name | Date |
|---|---|---|
| 671,501 | Staub | Apr. 9, 1901 |
| 2,134,908 | Copeman | Nov. 1, 1938 |
| 2,402,943 | Bogoslowsky | July 2, 1946 |
| 2,501,570 | Larsen | Mar. 21, 1950 |
| 2,578,361 | Kappel | Dec. 11, 1951 |

FOREIGN PATENTS

| Number | Country | Date |
|---|---|---|
| 428,848 | France | Sept. 8, 1911 |
| 848,960 | France | Nov. 9, 1939 |
| 521,960 | Germany | May 7, 1930 |
| 570,067 | Germany | Feb. 11, 1933 |